(12) United States Patent
Chuang et al.

(10) Patent No.: US 7,573,730 B2
(45) Date of Patent: Aug. 11, 2009

(54) CHARGING DEVICE WITH BOUNDARY MODE CONTROL

(75) Inventors: Ming-Nan Chuang, Hsin-Chu (TW); Yi-Shan Chu, Hsin-Chu (TW); Yu-Bin Wang, Hsin-Chu (TW)

(73) Assignee: Leadtrend Technology Corp., Hsin-Chu (TW)

( * ) Notice: Subject to any disclaimer, the term of this patent is extended or adjusted under 35 U.S.C. 154(b) by 132 days.

(21) Appl. No.: 11/936,790

(22) Filed: Nov. 8, 2007

(65) Prior Publication Data

US 2009/0121674 A1  May 14, 2009

(51) Int. Cl.
*H02M 3/335* (2006.01)
(52) U.S. Cl. .................. 363/21.02; 363/20; 363/21.01; 363/21.12; 363/21.18
(58) Field of Classification Search .................. 363/15, 363/16, 20, 21.01, 21.02, 21.03, 21.12, 21.18, 363/123, 124, 131, 132
See application file for complete search history.

(56) References Cited

U.S. PATENT DOCUMENTS 6,038,144 A * 3/2000 Matsumoto et al. ........... 363/19
6,826,063 B2 * 11/2004 Ichikawa et al. .............. 363/41

\* cited by examiner

*Primary Examiner*—Akm E Ullah
*Assistant Examiner*—Richard V Muralidar
(74) *Attorney, Agent, or Firm*—Winston Hsu (57) ABSTRACT

A charging device with boundary mode control is disclosed. The charging device includes a transformer, a power switch, a detection circuit and a pulse-width modulation (PWM) controller. The power switch is electrically connected to one end of a primary-side winding of the transformer. The detection circuit is electrically connected to the primary-side winding and the power switch. The detection circuit detects the resonance of the parasitic capacitance of the power switch, thereby generating a detection signal for boundary mode control. The PWM controller generates a pulse-width modulation signal for driving the power switch, and turns on the power switch according to the detection signal.

9 Claims, 11 Drawing Sheets

$V_{in}$: Input voltage
$V_{OUT}$: Output voltage
$I_p$: Primary-side current
$I_s$: Secondary-side current

FIG. 1 PRIOR ART $V_{in}$: Input voltage
$V_{OUT}$: Output voltage
$C_{in}$: Input capacitor
$I_{in}$: Average charging current
$I_p$: Primary-side current
$I_s$: Secondary-side current

$I_p$ : Primary-side current
$I_s$ : Secondary-side current
$V_{SW}$ : Drain voltage of power switch 53
VF : Forward voltage drop of diode 544

CHARGING DEVICE WITH BOUNDARY MODE CONTROL

BACKGROUND OF THE INVENTION

1. Field of the Invention

The present invention relates to a charging device, and more particularly, to a charging device with boundary mode control.

2. Description of the Prior Art

In the prior art, charging control of a common charging device usually includes two methods: continuous conduction mode (CCM), and discontinuous conduction mode (DCM).

Figure 1:
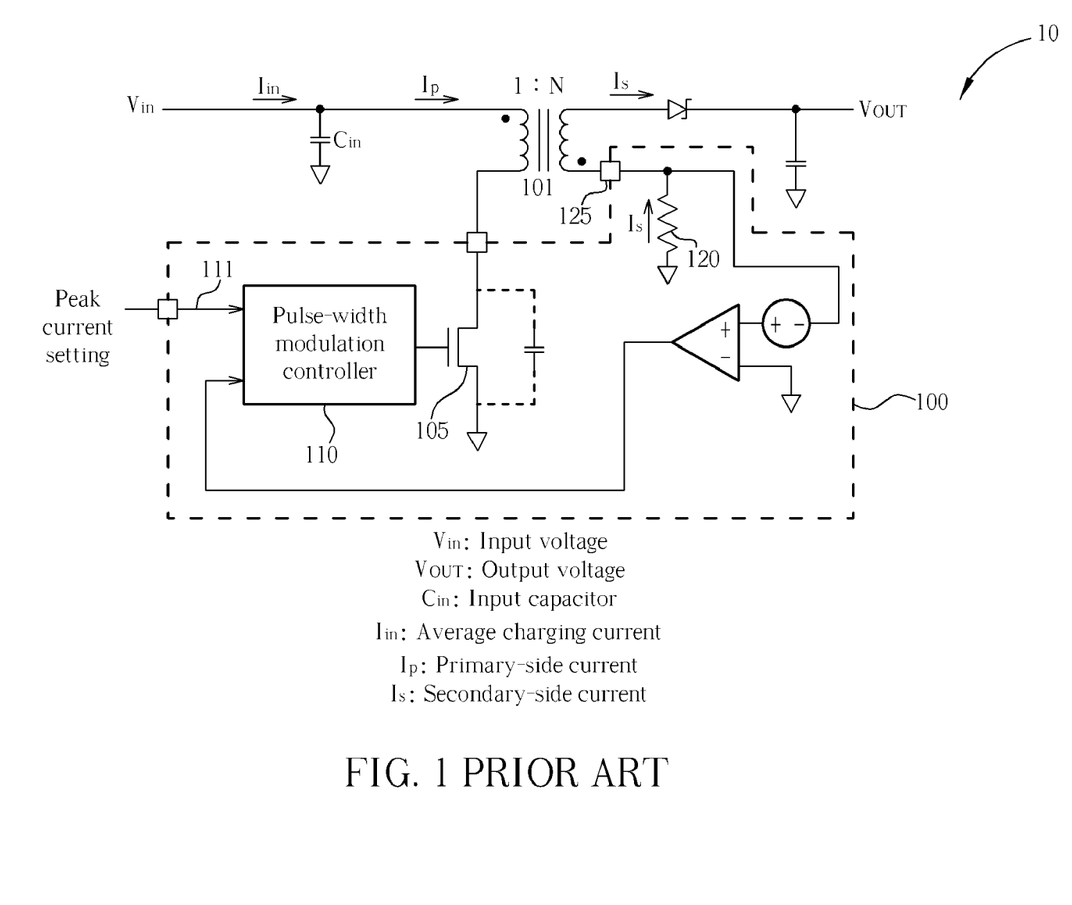
FIG. 1 is a diagram of a charging device with continuous conduction mode control according to the prior art.
Figure 2:
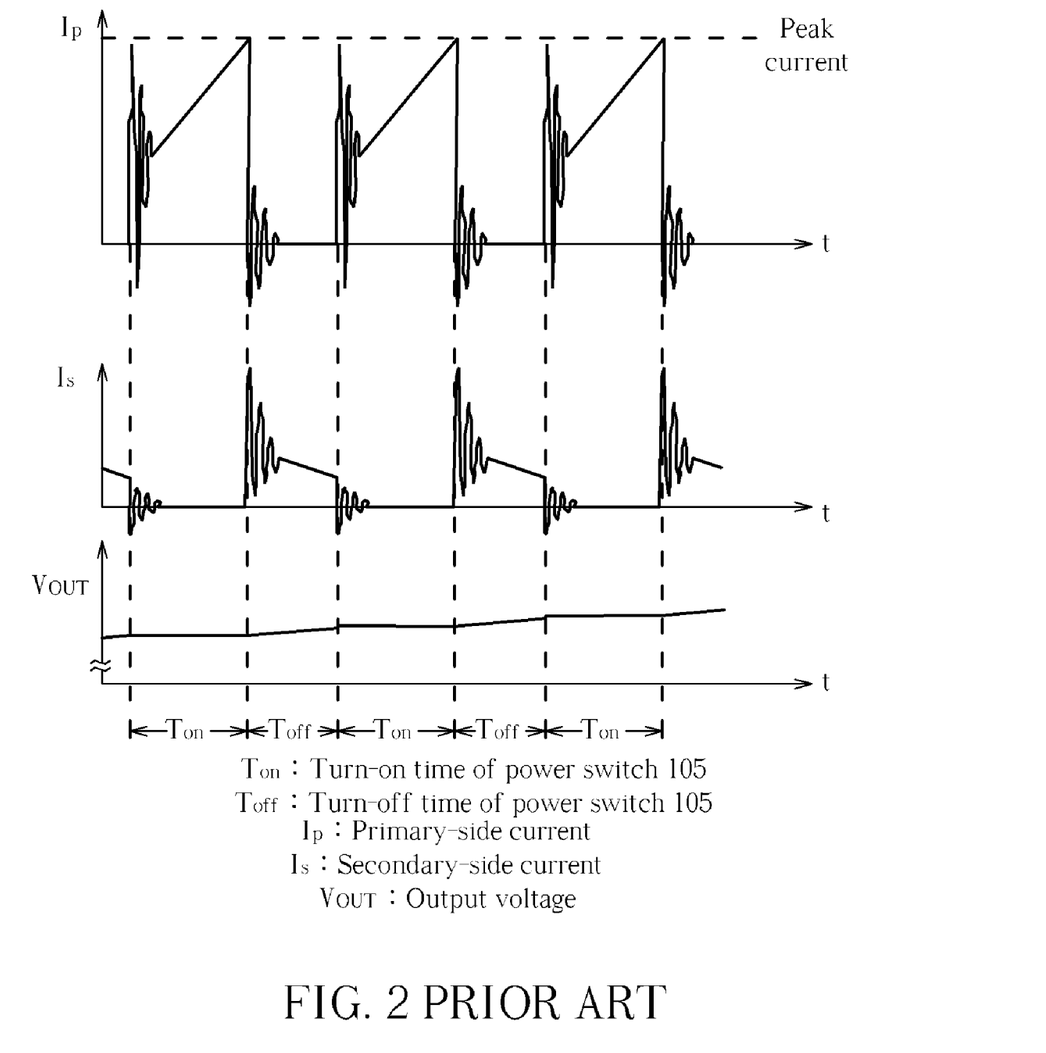
FIG. 2 is a waveform diagram of the primary-side current, the secondary-side current, and the output voltage shown in FIG. 1.

FIG. 1 is a diagram of a charging device 10 with continuous conduction mode control according to the prior art. When the power switch 105 is turned on, a primary-side current Ip increases. If the primary-side current Ip increases to the peak current setting value (which is set by the peak current setting end 111 of the pulse-width modulation (PWM) controller 110), the power switch 105 is turned off. When the power switch 105 is turned off, a secondary-side current Is starts to decrease (please refer to FIG. 2). When the secondary-side current Is does not decrease to zero, the power switch 105 is turned on again. The charging device 10 includes the following characteristics and advantages: (1) Short charging time and high charging efficiency. (2) A smaller maximum value of the primary-side current Ip and a higher switching frequency, so it can be applied to a small-scale transformer to save the volume of the power converter system. (3) With the higher switching frequency, a smaller input capacitor Cin can cause small average charging current ripples. However, the charging device 10 still includes the following disadvantages, for example: (1) A detecting resistor 120 connected to the secondary-side winding of the transformer 101 is necessary for detecting the second-side current, so the PWM control chip 100 must have a pin 125 to measure the voltage across the detecting resistor 120. (2) There is a swing current phenomenon in the primary-side current Ip (please refer to FIG. 2), so longer swing current times of the transformer may result in a fault trigger of the current level. (3) There is also still a swing current phenomenon in the secondary-side current Is due to the transformer being non-ideal, so the turn-off time of the power switch 105 during charging is not fixed if the swing current phenomenon in the secondary-side current is too serious. That is, the average charging current in is not smooth and exhibits a shaking phenomenon.

Figure 3:
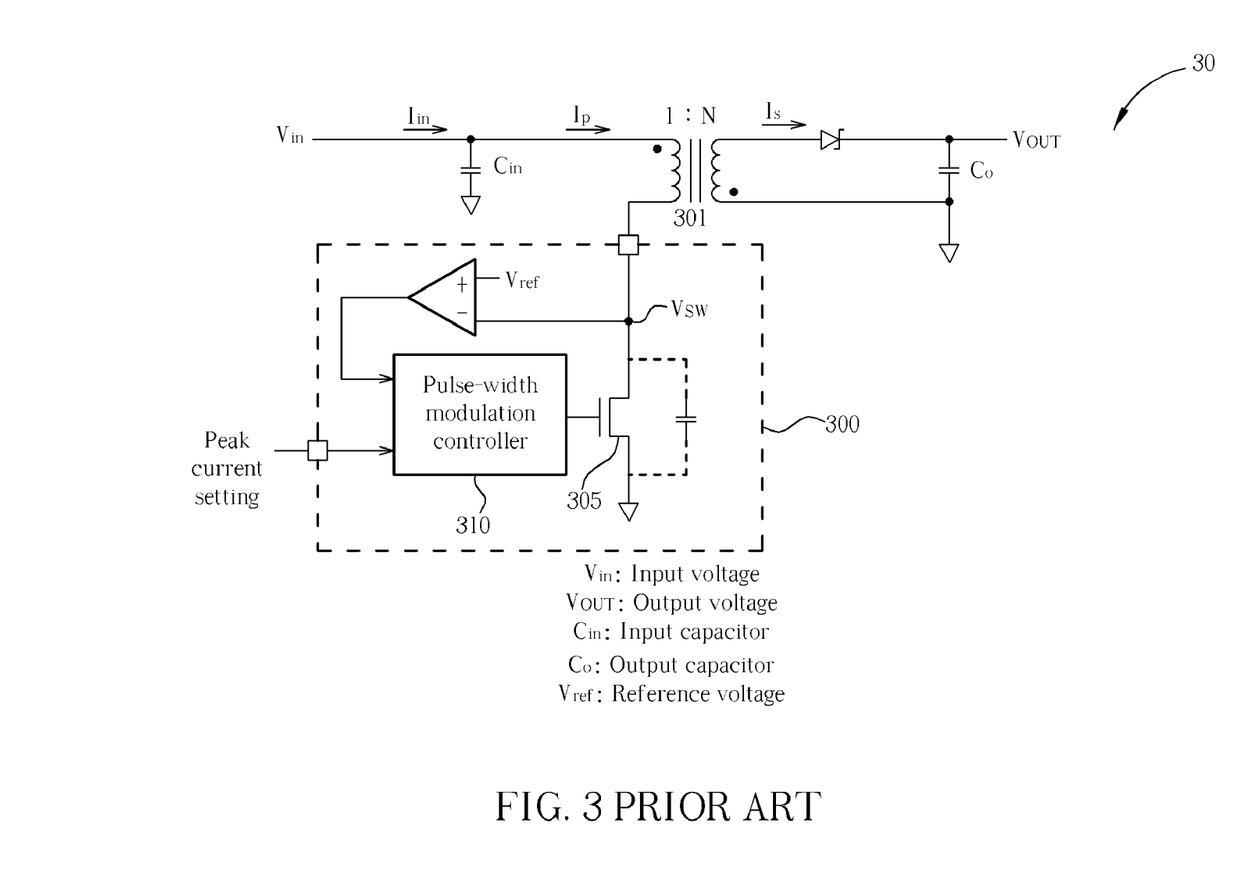
FIG. 3 is a diagram of a charging device with discontinuous conduction mode control according to the prior art.
Figure 4:
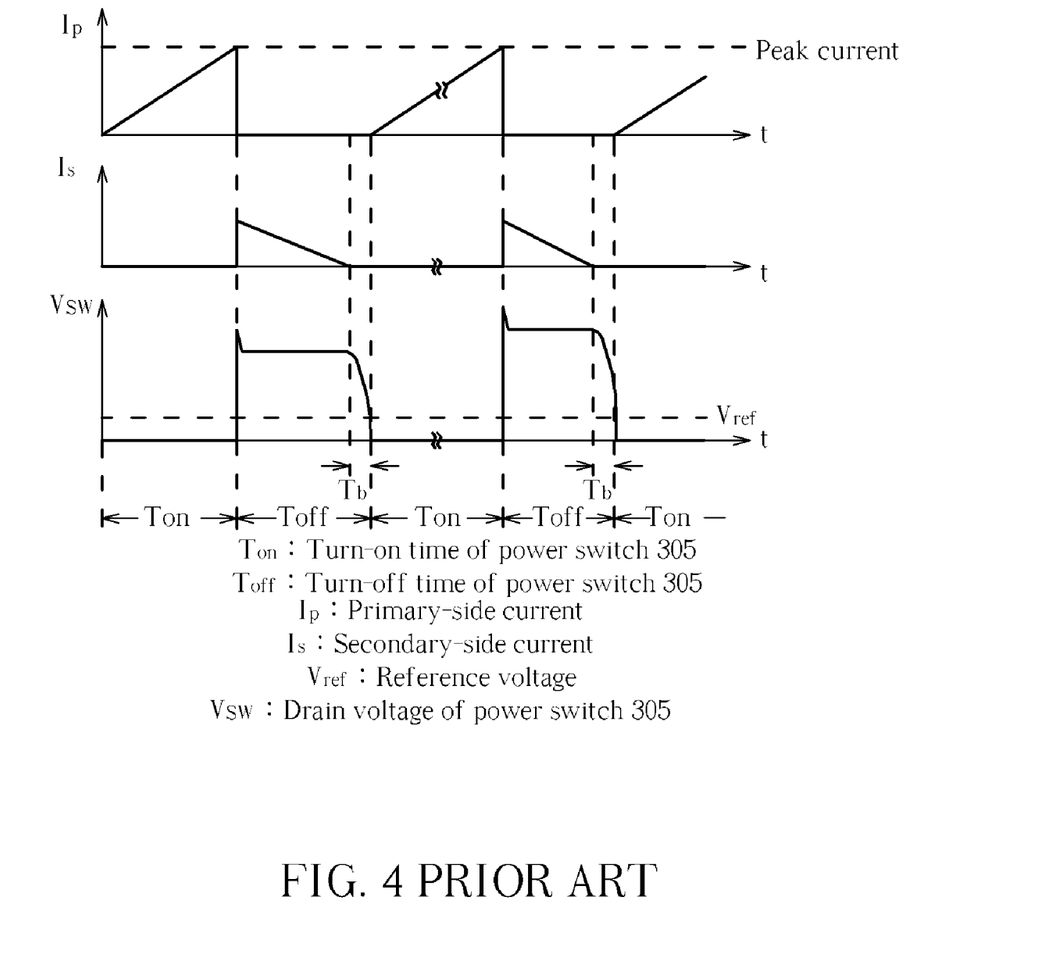
FIG. 4 is a waveform diagram of the primary-side current, the secondary-side current, and the drain voltage of the power switch shown in FIG. 3.

FIG. 3 is a diagram of a charging device 30 with discontinuous conduction mode (DCM) control according to the prior art. When the power switch 305 is turned off, the secondary-side current Is gradually decreases to zero (please refer to FIG. 4). After a period of time, the power switch will be turned on again. The charging device 30 includes the following characteristics: (1) A detecting resistor connected to the secondary-side winding of the transformer 301 for detecting the second-side current is not necessary, and thus the PWM control chip 300 needn't have a detecting pin. (2) A swing current phenomenon does not happen in the primary-side current Ip. (3) Due to the secondary-side current Is not being detected, a swing current phenomenon won't happen in the secondary-side current Is, so the average charging current in is smoother and shows no shaking phenomenon. The charging device 30 still includes the following disadvantages, however: (1) After the power switch 305 is turned off, the secondary-side current Is decreases to zero, and when the drain voltage Vsw of the power switch 305 decreases to a reference voltage Vref due to resonance, the power switch 305 will be turned on again. At this time, the portion of turn-off time Toff of the power switch 305 occupied by the blank time Tb increases as the voltage Vsw becomes higher (shown in FIG. 4). Because the charging device 30 doesn't transmit the energy from the input voltage Vin to the output capacitor Co during the blank time Tb, the total charging time is longer and charging efficiency is lower. (2) The turn-off time Toff of the power switch gets longer and the switching frequency is smaller due to the blank time, so a larger transformer is needed. (3) Because the switching frequency is smaller, a larger input capacitor Cin is needed to cause small average charging current Iin ripples. (4) With the increase of output voltage Vout during charging, the average charging current Iin cannot be fixed and decreases gradually.

In view of this, a charging device with boundary mode control is disclosed in the present invention to improve the problems of the prior art.

SUMMARY OF THE INVENTION

It is one of the objectives of the claimed invention to provide a charging device with boundary mode control to solve the abovementioned problems.

The present invention discloses a charging device with boundary mode control. The charging device includes a transformer, a power switch, a detection circuit, and a pulse-width modulation (PWM) controller. The power switch is electrically connected in serial to one end of a primary-side winding of the transformer. The detection circuit is electrically connected to the primary-side winding of the transformer and the power switch. The detection circuit is used for detecting the resonance of parasitic capacitance of the power switch to provide a detection signal for boundary mode control when the power switch is turned off. The PWM controller is used for generating a pulse-width modulation signal for driving the power switch and turning on the power switch according to the detection signal.

These and other objectives of the present invention will no doubt become obvious to those of ordinary skill in the art after reading the following detailed description of the preferred embodiment that is illustrated in the various figures and drawings.

DETAILED DESCRIPTION

The present invention discloses a charging device, and more particularly, a charging device with boundary mode control. Please refer to the following descriptions together with the drawings in order to make the illustration of the present invention more detailed and comprehensive.

Figure 5:
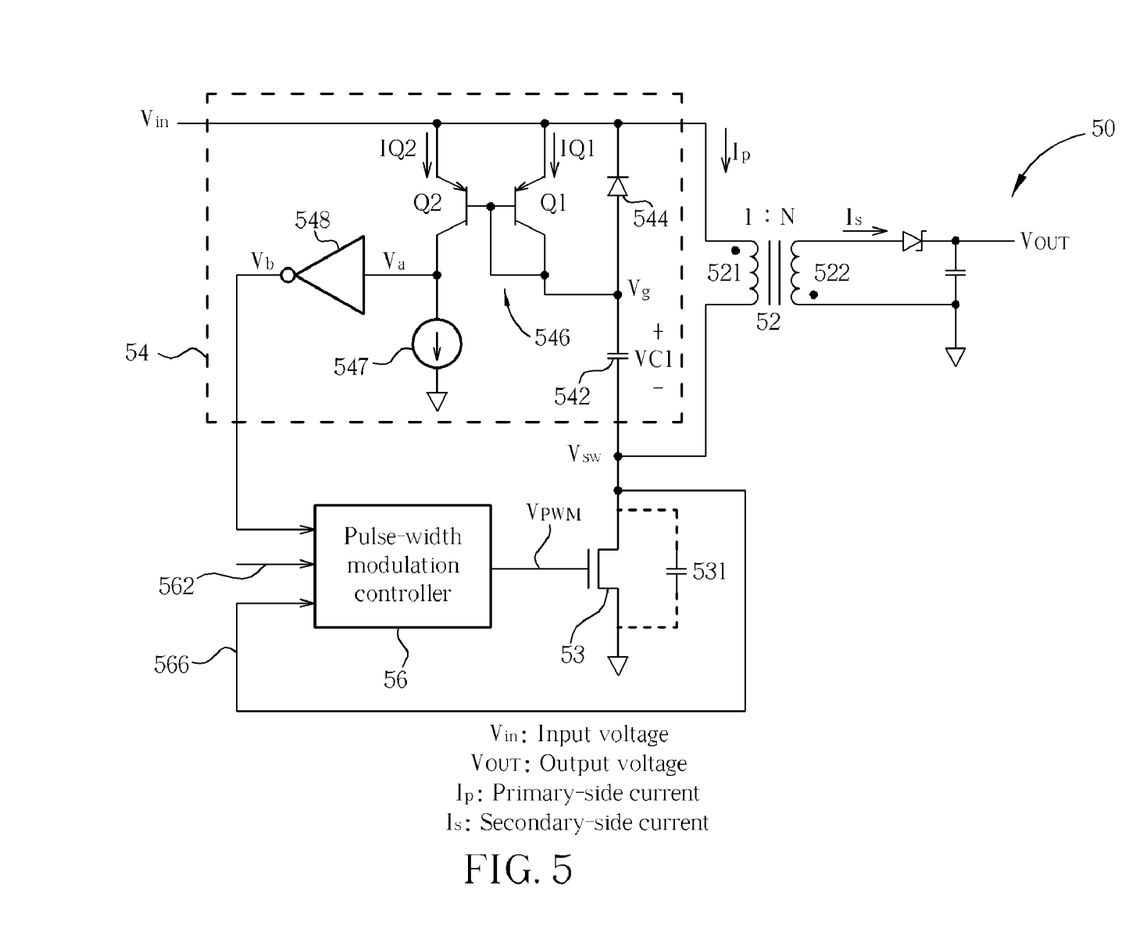
FIG. 5 is a diagram of a charging device according to a first embodiment of the present invention.

Please refer to FIG. 5, which is a circuit diagram of a charging device 50 according to a first embodiment of the present invention. In this embodiment, the charging device 50 includes a transformer 52, a power switch 53, a detection circuit 54, and a pulse-width modulation (PWM) controller 56. The transformer 52 further includes a primary-side winding 521 and a secondary-side winding 522, which has a turn ratio of 1:N respectively. The primary-side winding 521 is used for generating a magnetic voltage, and the secondary-side winding 522 is used for generating an induced magnetic voltage through co-working with the primary-side winding 521. The detection circuit 54 further includes a capacitor 542, a diode 544, a current mirror 546, a current source 547, and an inverter 548. In addition, the PWM controller 56 further includes three input terminals, which are respectively connected to a peak current setting end 562, an measured current end 566, and an output signal Vb of the detection circuit 54.

Figure 6:
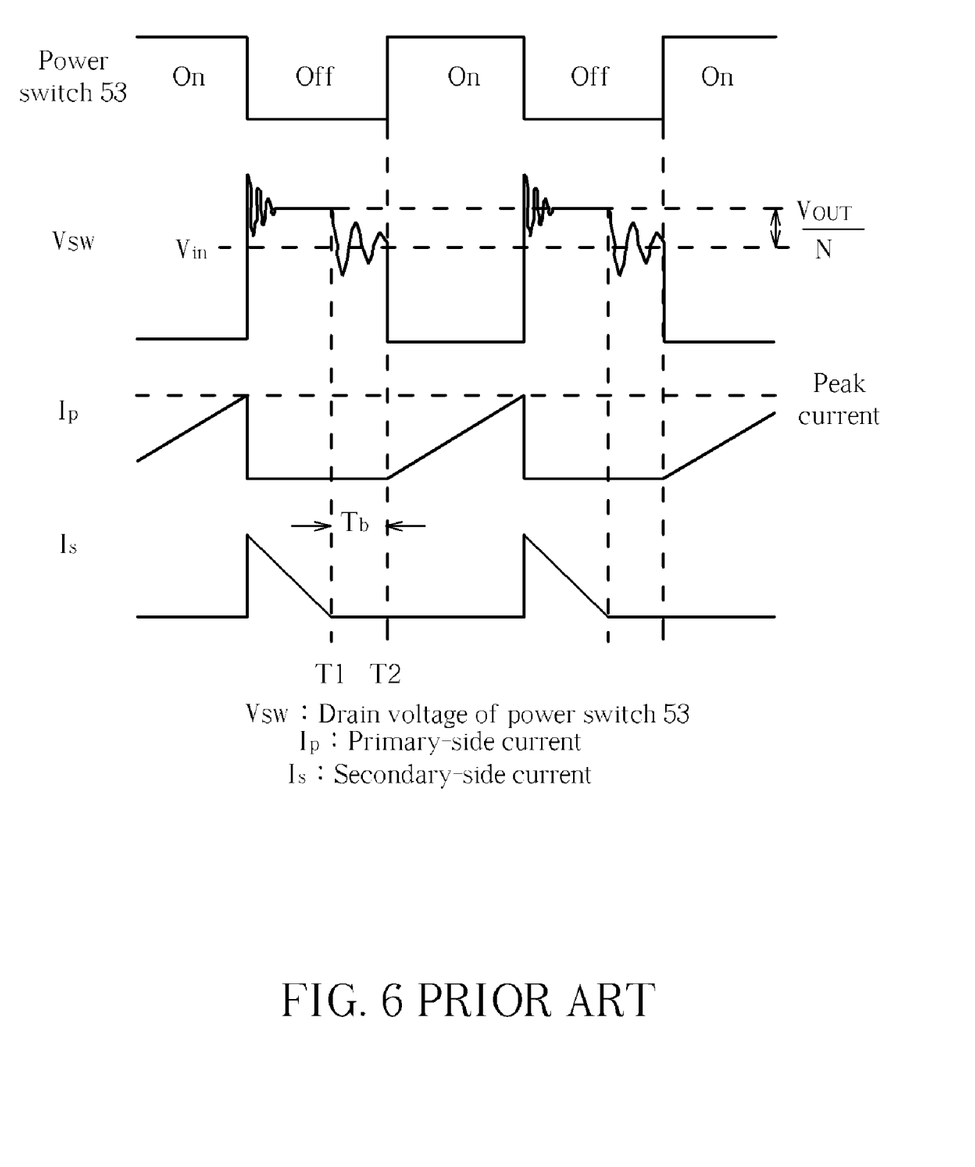
FIG. 6 is a waveform diagram of the discontinuous conduction mode according to the prior art.

When a charging device operates in discontinuous conduction mode, the waveform is shown in FIG. 6.

Figure 7:
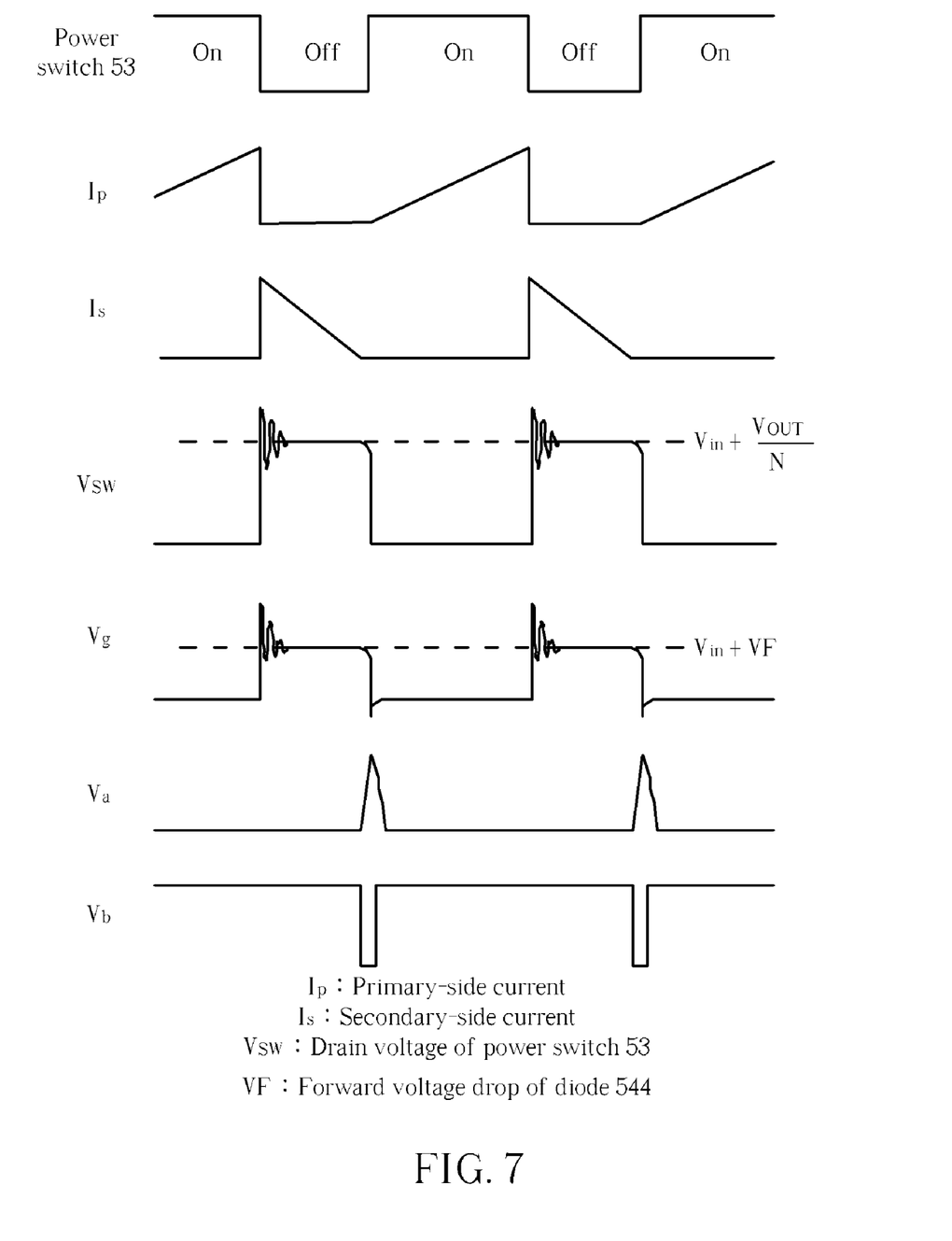
FIG. 7 is a waveform diagram of the first embodiment of the present invention.

In this embodiment, operations of the charging device 50 are listed below. When the power switch 53 is turned on, a current Ip of the primary-side winding is increased. If the current Ip reaches the peak current setting value (which is set by the peak current setting end 562 of the PWM controller 56), the power switch 53 is turned off. When the detection circuit 54 detects that the drain voltage Vsw of the power switch 53 starts to decrease, the output signal Vb of a low logic level is transmitted to the PWM controller 56 and then the PWM controller 56 outputs a PWM signal $V_{PWM}$ of a high logic level to turn on the power switch 53. When the power switch 53 is turned off and a current Is of the secondary-side winding 522 is decreased below 0 (at time T1), the drain voltage of the power switch 53 will produce a sine-wave-like waveform due to resonance until the power switch 53 is turned on (at time T2). The voltage Vsw then drops to 0 immediately. The mentioned PWM controller 56 in this embodiment immediately detects the resonance and transmits signals to turn on the power switch 53 to stop the circuit from operating in a deep discontinuous conduction mode control. In other words, when the charging device 50 operates in discontinuous conduction mode, Tb is close to 0. FIG. 7 is a waveform diagram of the first embodiment of the present invention.

Among them, the operations of the PWM controller 56 are described in the following. When the power switch 53 is turned off and the current Is of the secondary-side winding 522 still has not reached 0, the voltage Vsw is maintained at Vsw=(Vout/N)+Vin and the voltage of the capacitor 542 is maintained at $V_{c1}$=−[(Vout/N)−VF], where VF is a forward voltage drop of the diode 544 and a voltage Vg complies with Vg=Vin+VF. At this time, two transistors Q1 and Q2 of the current mirror 546 are turned off and $I_{Q1}$=$I_{Q2}$=0. Va is at low logic level and Vb is at high logic level.

When the current Is of the secondary-side winding 522 decreases to 0, the voltage Vsw will decrease due to the resonance of parasitic capacitance 531 of the power switch 53. The voltage signal Vsw is coupled to the voltage Vg through the capacitor 542, so the voltage Vg will start to decrease at this time. Therefore, the transistor Q1 of the current mirror 546 is turned on to generate a current $I_{Q1}$ flowing from the input voltage Vin through the transistor Q1 to the capacitor 542. Because the transistors Q1 and Q2 compose a current mirror 546, the transistor Q2 also generates a current $I_{Q2}$ flowing from the input voltage Vin to the current source 547. The current $I_{Q2}$ is designed to have a value greater than that of the current source 547, which increases the voltage Va of the input terminal of the inverter 548 to the high logic level and causes the voltage Vb of the output terminal of the inverter 548 to be the low logic level. Thereby the PWM controller 56 is triggered to turn on the power switch 53.

In the abovementioned embodiments, the charging device constructed by BJTs is adopted. In other embodiments, FETs or MOSFETs or combination of them can be used to implement effectiveness of the present invention. Those skilled in the art should appreciate that the charging device is not limited to be implemented with BJTs.

Figure 8:
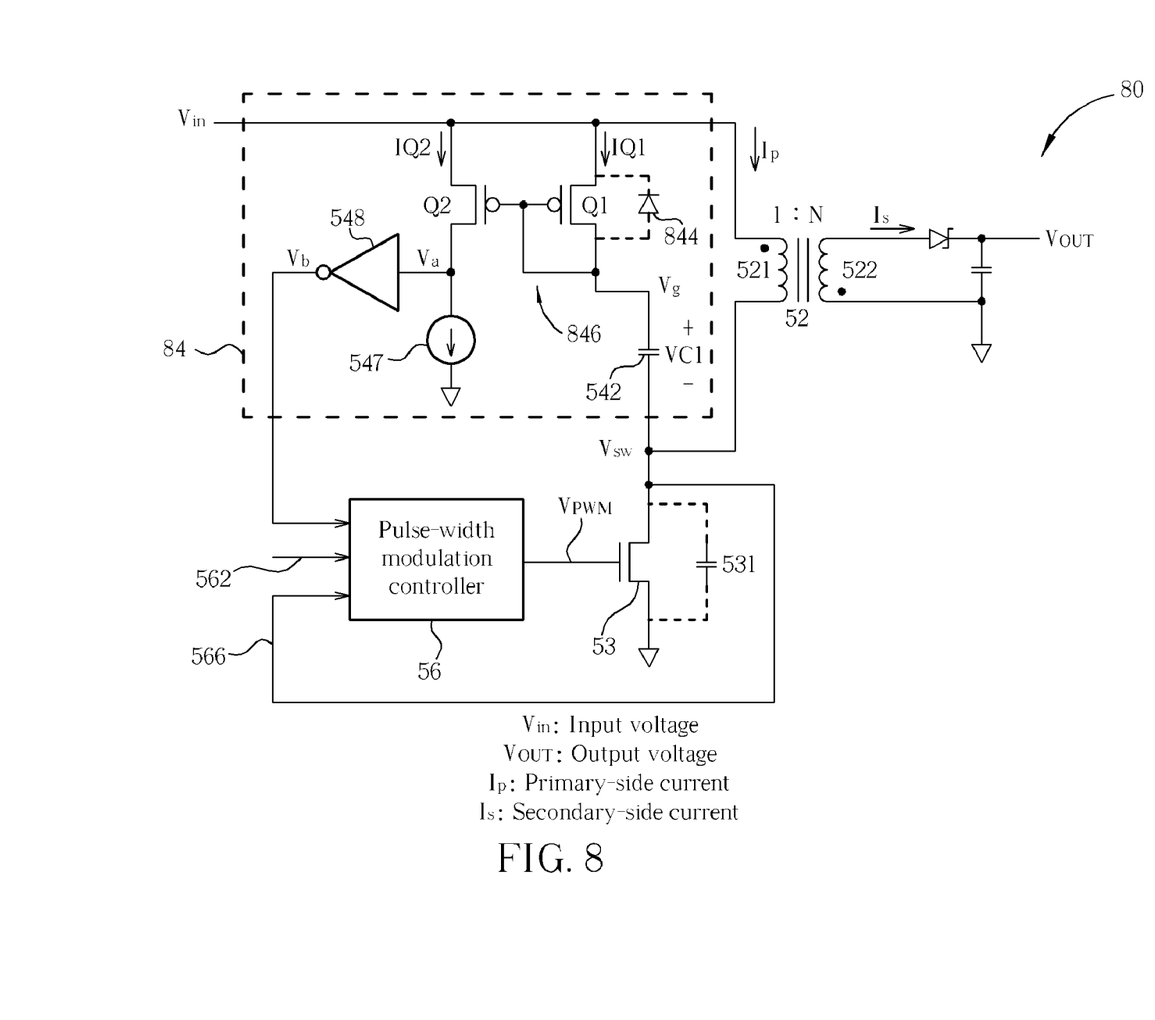
FIG. 8 is a diagram of a charging device according to a second embodiment of the present invention.

FIG. 8 is a diagram of a charging device 80 according to a second embodiment of the present invention. The difference between the charging device 80 and the charging device 50 of the first embodiment is that the transistors Q1 and Q2 of a current mirror 846 in a detection circuit 84 of the charging device 80 are PMOS transistors. Due to PMOS itself having a parasitical diode 844, the diode 544 can be omitted.

Figure 9:
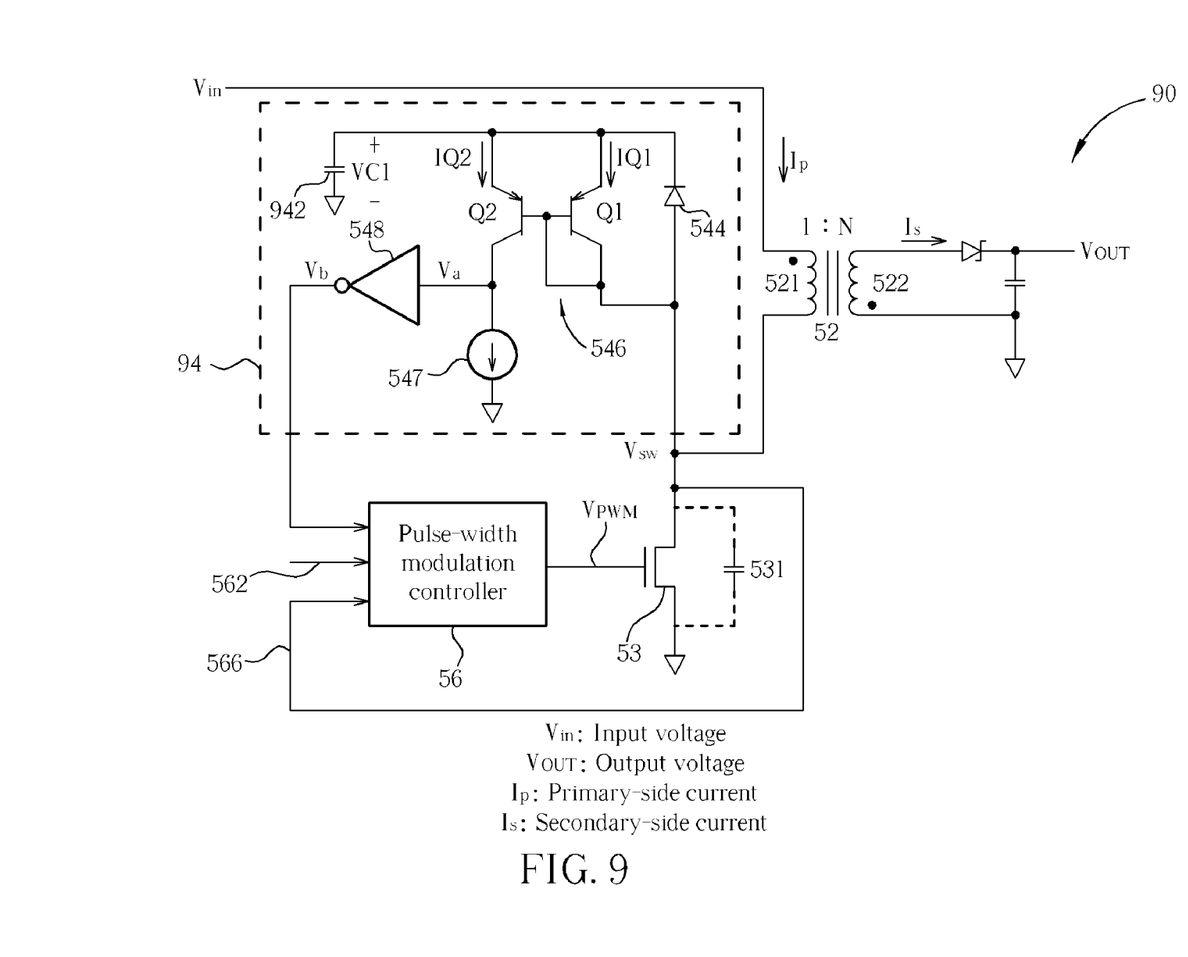
FIG. 9 is a diagram of a charging device according to a third embodiment of the present invention.

FIG. 9 is a diagram of a charging device 90 according to a third embodiment of the present invention. Compared with the first embodiment, the position of the capacitor 542 of the charging device 50 is different from the position of a capacitor 942 of the charging device 90. But the charging device 90 still has the same effect as the charging device 50.

In this embodiment, the circuit 94 is the detection circuit. When the power switch 53 is turned off and the current Is of the secondary-side winding has not decreased to 0 yet, the voltage Vsw is maintained at (Vout/N)+Vin (please refer to FIG. 10). The voltage of the capacitor 942 is maintained at $V_{c1}$=(Vout/N)+Vin−VF. Both the transistors Q1 and Q2 of the current mirror 546 are turned off and $I_{Q1}$=$I_{Q2}$=0. The voltage Va is at low logic level, and the voltage Vb is at high logic level.

Figure 10:
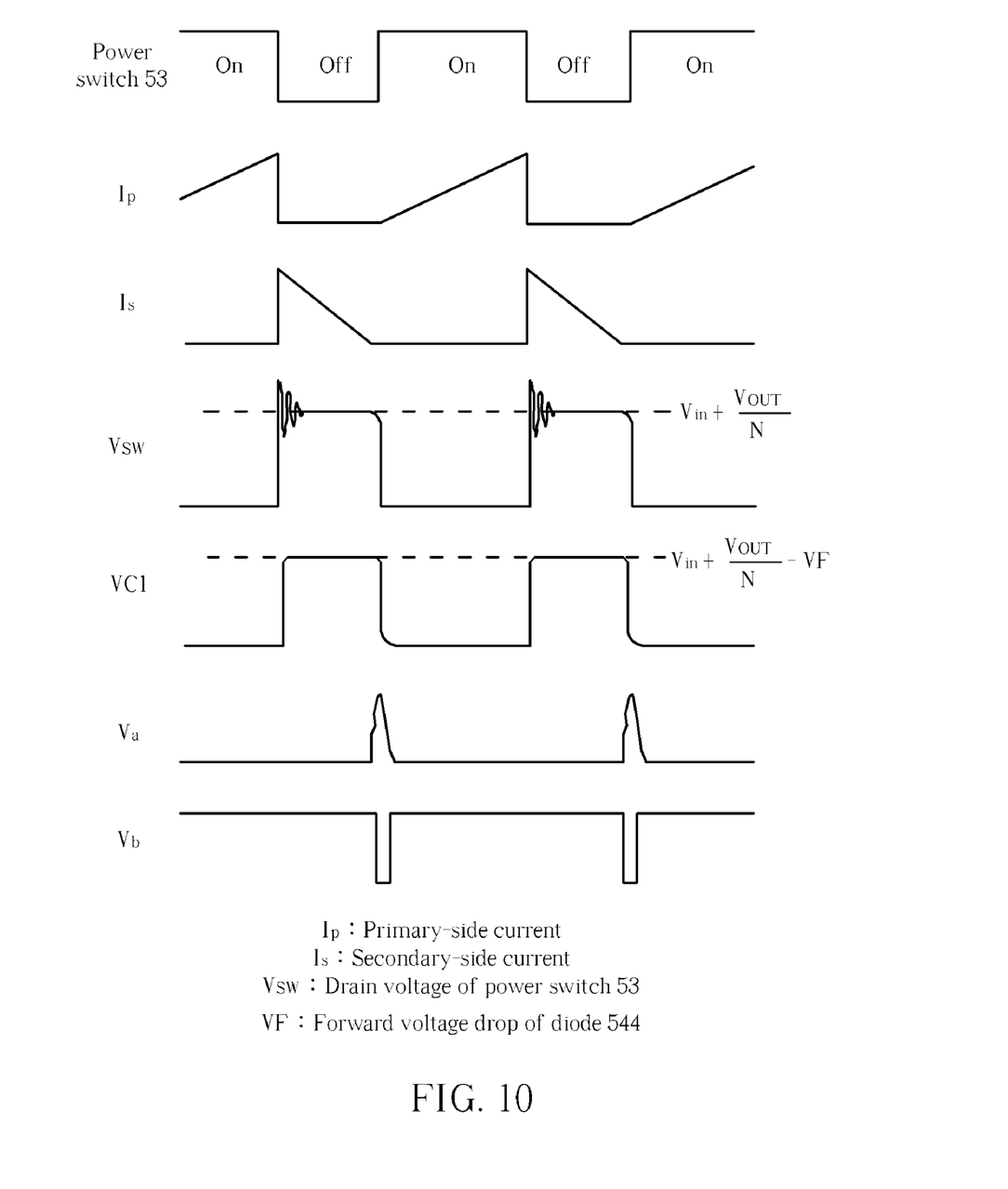
FIG. 10 is a waveform diagram of the third embodiment of the present invention.

When the current Is of the secondary-side winding 522 decreases to 0, the voltage Vsw will decrease due to resonance. Therefore, the transistor Q1 of the current mirror 546 is turned on to generate a current $I_{Q1}$ flowing from the capacitor 942 through the transistor Q1 to the transformer 52. Because the transistors Q1 and Q2 compose the current mirror 546, the transistor Q2 also generates a current $I_{Q2}$ flowing from the capacitor 942 to the current source 547. The current $I_{Q2}$ is designed to have a value greater than that of the current source 547, which increases the voltage Va to the high logic level and causes the voltage Vb to be the low logic level, thereby triggering the PWM controller 56 is to turn on the power switch 53. The waveforms of the third embodiment are shown in FIG. 10.

Figure 11:
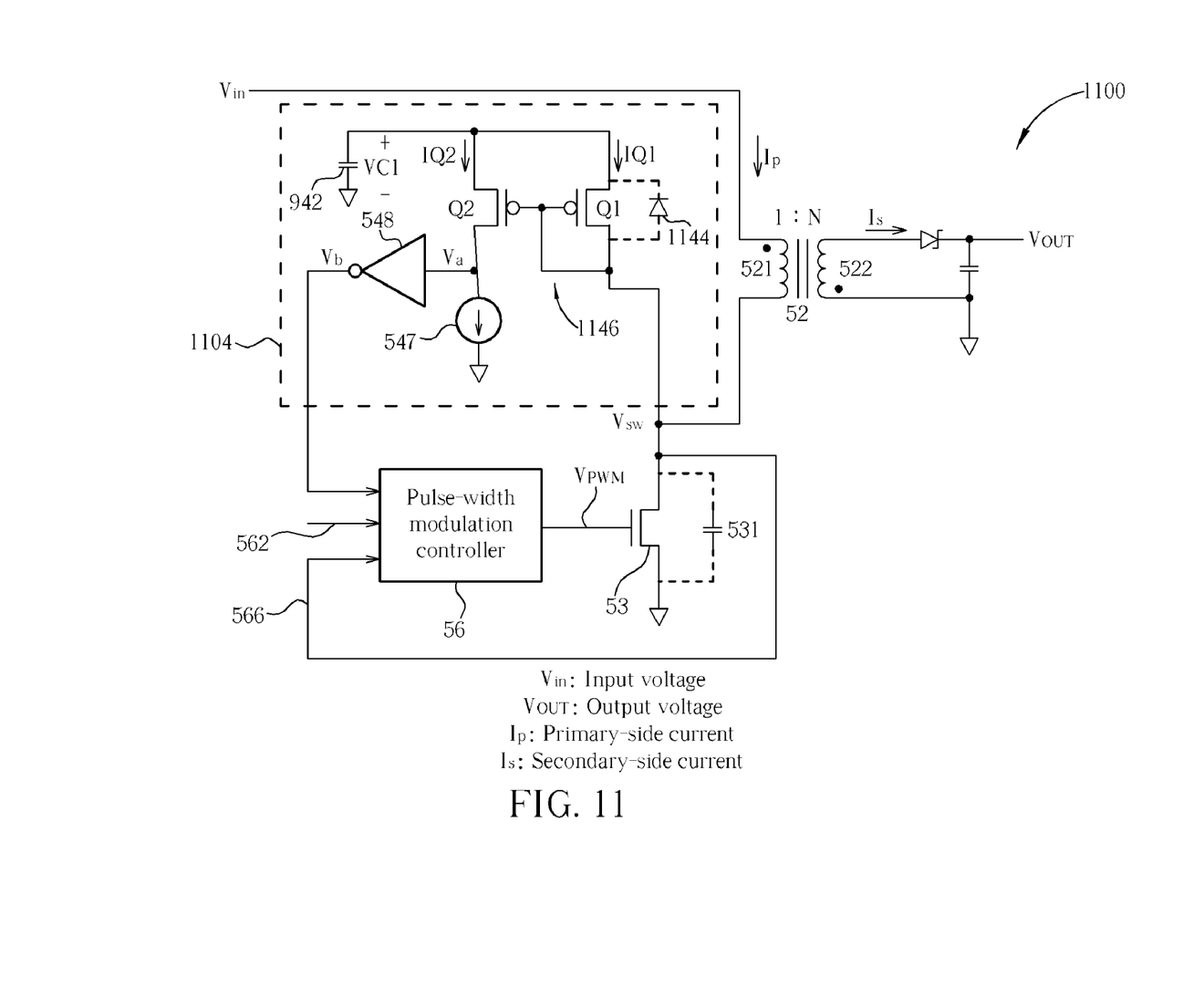
FIG. 11 is a diagram of a charging device according to a fourth embodiment of the present invention.

FIG. 11 is a diagram of a charging device 1100 according to a fourth embodiment of the present invention. The difference between the charging device 1100 and the charging device 90 is that the transistors Q1 and Q2 of a current mirror 1146 in a detection circuit 1104 of the charging device 1100 are PMOS transistors. Due to PMOS itself having a parasitic diode 1144, the diode 544 can be omitted.

The present invention improves upon the problems in the prior art and includes the following advantages:

(1) A secondary-side pin of the transformer and a detecting resistor for the secondary-side current detection can be eliminated.

(2) In the boundary mode, the primary-side current of the transformer has only a small swing current. Only a leading edge blanking time design is added to the circuit for preventing from trigging the peak current setting value incorrectly.

(3) Because the secondary-side current of the transformer is not being detected, the swing current phenomenon won't happen in the secondary-side current, so the average charging current is smooth and has no shaking phenomenon.

(4) At the moment the secondary-side current decreases to zero (i.e. when the drain voltage of the power switch begins to resonate), the MOS is turned on again (i.e. the blank time Tb is close to 0 ns) and performs energy transformation. The charging scheme is close to continuous conduction mode, so it has a short charging time and high charging efficiency.

(5) Because the switching frequency is higher, a smaller input capacitor can cause small average charging current ripples.

(6) Because the boundary mode control is close to the continuous conduction mode, the average charging current still has a smooth waveform when the output voltage is higher during charging.

(7) The detection circuit disclosed in the present invention is suitable for any kind of switching mode converter.

Those skilled in the art will readily observe that numerous modifications and alterations of the device and method may be made while retaining the teachings of the invention.

What is claimed is:

1. A charging device with boundary mode control comprising:
   a transformer;
   a power switch, electrically connected in serial to one end of a primary-side winding of the transformer;
   a detection circuit, electrically connected to the primary-side winding of the transformer and the power switch, the detection circuit being used for detecting a resonance of a parasitic capacitance of the power switch to provide a detection signal for boundary mode control when the power switch is turned off; and
   a pulse-width modulation (PWM) controller, for generating a pulse-width modulation signal for driving the power switch and turning on the power switch according to the detection signal.

2. The charging device of claim 1, wherein the detection circuit comprises:
   a current mirror, having a power source end electrically connected to another end of the primary-side winding of the transformer;
   a capacitor, having one end electrically connected to the power switch;
   a diode, having one end electrically connected to another end of the capacitor and to an input terminal of the current mirror, and another end electrically connected to the power source end of the current mirror;
   a current source, having one end electrically connected to a grounding end; and
   an inverter, having an input terminal electrically connected to another end of the current source and an output terminal of the current mirror, and an output terminal for outputting the detection signal.

3. The charging device of claim 2, wherein the current mirror is comprised of one pair of bipolar junction transistors (BJT).

4. The charging device of claim 1, wherein the detection circuit comprises:
   a current mirror, having an input terminal electrically connected to the power switch;
   a capacitor, having one end electrically connected to a grounding end;
   a diode, having one end electrically connected to another end of the capacitor and to a power source end of the current mirror, and another end electrically connected to the power switch;
   a current source, having one end electrically connected to the grounding end; and
   an inverter, having an input terminal electrically connected to another end of the current source and an output terminal of the current mirror, and an output terminal for outputting the detection signal.

5. The charging device of claim 4, wherein the current mirror is comprised of one pair of bipolar junction transistors (BJT).

6. The charging device of claim 1, wherein the detection circuit comprises:
   a current mirror, having a power source end electrically connected to another end of the primary-side winding of the transformer;
   a capacitor, having one end electrically connected to the power switch, and another end electrically connected to an input terminal of the current mirror;
   a current source, having one end electrically connected to a grounding end; and
   an inverter, having an input terminal electrically connected to another end of the current source and an output terminal of the current mirror, and an output terminal for outputting the detection signal.

7. The charging device of claim 6, wherein the current mirror is comprised of one pair of field effect transistors (FET).

8. The charging device of claim 1, wherein the detection circuit comprises:
   a current mirror, having an input terminal electrically connected to the power switch;
   a capacitor, having one end electrically connected to a grounding end, and another end electrically connected to a power source end of the current mirror;
   a current source, having one end electrically connected to a grounding end; and
   an inverter, having an input terminal electrically connected to another end of the current source and an output terminal of the current mirror, and an output terminal for outputting the detection signal.

9. The charging device of claim 8, wherein the current mirror is comprised of one pair of field effect transistors (FET).

* * * * *